(No Model.)
A. D. SMITH.
ATTACHMENT FOR CULTIVATORS.
No. 460,540. Patented Sept. 29, 1891.
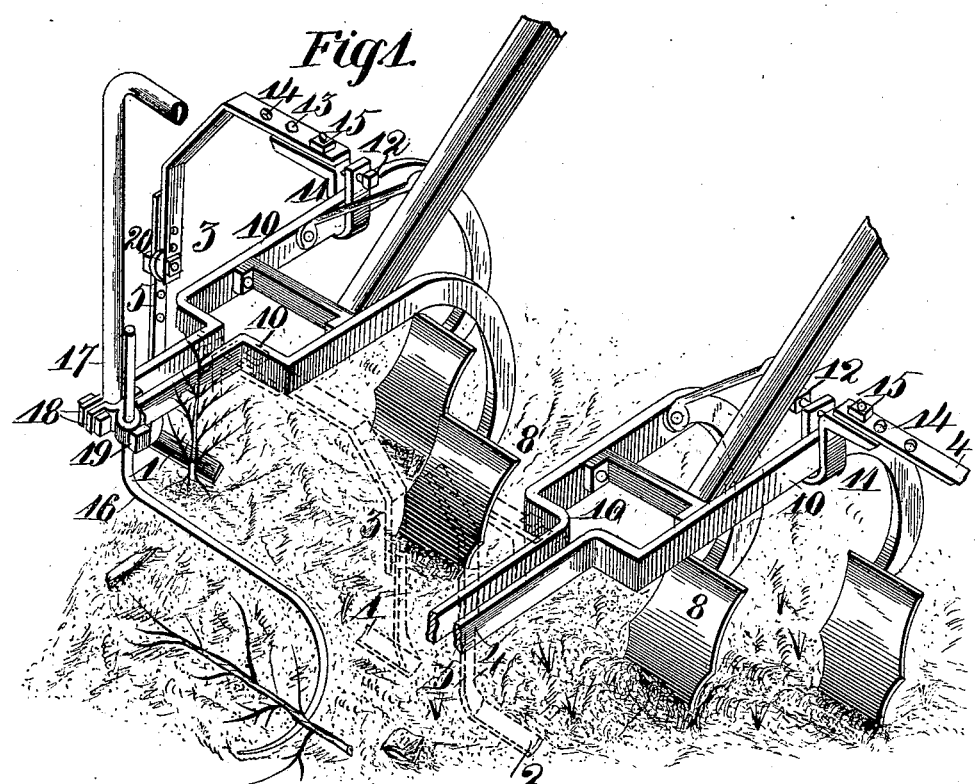
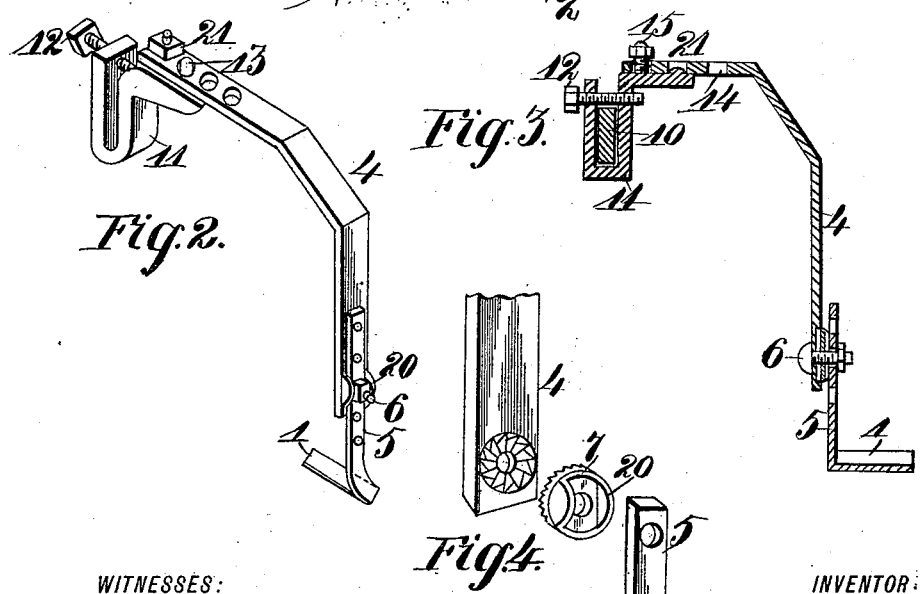
WITNESSES:
INVENTOR:
Albert D. Smith.
BY Higdon & Higdon
ATTORNEYS.

UNITED STATES PATENT OFFICE.

ALBERT D. SMITH, OF EMPORIA, KANSAS, ASSIGNOR OF ONE-HALF TO JOSEPH C. JONES, HORACE G. JONES, AND GEORGE F. JONES, ALL OF SAME PLACE.

ATTACHMENT FOR CULTIVATORS.

SPECIFICATION forming part of Letters Patent No. 460,540, dated September 29, 1891.

Application filed December 10, 1890. Serial No. 374,134. (No model.)

*To all whom it may concern:*

Be it known that I, ALBERT D. SMITH, of the city of Emporia, Lyon county, and State of Kansas, have invented certain new and useful Improvements in Attachments for Cultivators, of which the following is a full, clear, and exact description, reference being had to the accompanying drawings, forming a part hereof.

My invention relates to improvements in attachments for cultivators; and it consists in the novel arrangement and combination of parts, as will be more fully hereinafter described, and designated in the claims.

In the drawings, Figure 1 is a perspective view of my invention as applied to a cultivator. Fig. 2 is a perspective view of one of the knives or scrapers detached, which I employ in carrying out my invention. Fig. 3 is a vertical longitudinal section taken through the plow-beams, main arm, and clamp for holding the main arm to said plow-beam. Fig. 4 is a detailed view of the engagement between the arm and the stem of the knife and the mechanism for effecting said engagement.

Referring to the drawings, 1 and 2 represent steel knives or scrapers, which constitute the essential feature of my invention. Said knives or scrapers are adjustably secured to main arms 3 and 4, respectively. Said knives are also provided with stems 5, and said stems are bolted or otherwise secured to the aforesaid main arms by means of bolts 6, and interposed between said stems and main arms are centrally-corrugated disks 7. Said disks have shoulders 20, between which the stems of the knives fit, whereby said disks are rendered immovable on said stems. The corrugated surface of said disks are adapted to be brought in contact and mesh with similar corrugations on the lower portion of the arms, whereby the impinging contact and friction is increased and the stems 5 of the knives are rendered immovable upon the arms.

The knives are adapted to be adjusted in front of the plows 8 of the cultivator and movable therewith in a position approximately parallel and slanting back at an angle of forty-five degrees to the surface of the ground. The sharpened edges of the knives being brought in contact with the weeds, &c., which are in the path of the plows, will effectually cut down said weeds, &c., and make the operation of the plows more functional. Said knives have a twisting bend, so that they will also guide over obstructions without catching same, as it is not a square angle, but pitched at an angle of forty-five degrees. The knives move along close to the corn or hill of any sown product, and the cutting-edges thereof will cut down all the voluntary vegetable growth that interferes with the growth and development of the planted products.

The arms 3 and 4 are secured to the plow-beams 10 by means of clamp-pieces 11, which clamp-pieces are adapted to pass over the beams, and are there secured by means of bolts 12, which pass through said clamp-pieces above the beam. Said clamp-pieces are provided with projections or teats 13, formed on the upper surface of said clamp-pieces and adapted to fit into suitable depressions or perforations 14, formed on the under surface of the main arms whereby said arms are prevented from turning on said clamp-pieces, when the knives in their functional operation meet with resistance. Said arms and said clamp-pieces are secured together by means of bolts 15, which pass through said clamp-pieces, and said arms are brought in close or the desired contact by nuts 21, which are adapted to be screwed on said bolts.

The arms and knives are right and left and may be attached in the rear and outer sides of the cultivator, as shown in Fig. 1. They are generally used in this position in the last plowing of the corn or when the corn is laid by. The cutting-edges of the knives commences on the upright portion of the same five or six inches above the ground.

16 represents a steel rod, which is used for cleaning the trash out of the path of the plows and prevents them from being clogged, and consequently retarded in their functional operation. This rod can be used on either side or both sides, as desired, of the beam yoke or axle 17. This trash-hook can be used separately from the other in attaching to any plow, cultivator, or implement.

18 represents clamp-pieces, which are adapted to be clasped over the beam yoke or axle 17. One of said clamp-pieces is provided with a perforation through which the trash hook or rod 16 is adapted to pass. The rod or trash hook is held in its proper adjustment in the perforation made in the said clamp-pieces by means of a set-screw 19. The rod moves along in front of the plows and removes all the loose trash and vegetable accumulations that may perchance get in its path. Said rod may also be provided with an eye and bolted on the arms 3 and 4, as shown in dotted lines in Fig. 1.

I am aware that prior to my invention trash-hooks have been used in connection with cultivators, to which they have been secured in various manners, and I do not therefore claim a trash-hook, broadly; but What I do claim is—

1. An attachment for cultivators, plows, &c., consisting of arms 3 and 4, provided at their lower portions with corrugations, clamp-pieces 11 for securing said arms to the frame-work of said cultivators, plows, &c., knives 1 and 2, secured to the lower portions of said arms 3 and 4, respectively, and corrugated disks 7, provided with shoulders, between which shoulders the stems 5 of said knives are adapted to be placed, and corrugations adapted to mesh with corrugations formed on the lower portions of said arms, whereby said knives are effectively adjusted on the same, substantially as set forth.

2. In a cultivator, a trash-hook 16, in combination with clamp-pieces 18, one of which is provided with a perforation, and a set-screw 19 for holding said rod in any desired adjustment, substantially as and for the purposes specified.

3. An attachment for cultivators, consisting of a clamping-piece 11, a bolt adapted to secure the said clamping-piece in position, a main arm 4, laterally adjustable on the said clamping-piece, and a knife having a vertical shank 5 thereon, the said shank being vertically adjustable on the said arm and being adapted to be inclined in relation thereto, as described.

4. An attachment for cultivators, consisting of a clamping-piece 11, having teats thereon, a main arm 4, having a vertical and horizontal portion, the said horizontal portion having a series of perforations therein, the lower end of the said vertical portion being corrugated, a knife having a vertical shank thereon, having a series of perforations therein, a corrugated disk having shoulders thereon engaging the said shank, and bolts passing through the said clamping-piece and the horizontal portion of the main brace and through the vertical shank of the knife, the corrugated end of the vertical portion of the arm, and the corrugated disk, as described.

5. An attachment for cultivators, consisting of a clamping-piece, an arm secured thereto, the lower portion of the said arm being vertical and having a circular corrugated depression therein, a knife having a vertical shank, a corrugated disk having shoulder 20, adapted to engage the said shank, and a bolt passing through the said shank, the disk, and the corrugated depressed portion of the arm, as described.

In testimony whereof I affix my signature in presence of two witnesses.

ALBERT D. SMITH.

Witnesses:
 WM. F. EMERY,
 A. L. BENNETT.